US012005622B2

(12) United States Patent
Jiang et al.

(10) Patent No.: US 12,005,622 B2
(45) Date of Patent: Jun. 11, 2024

(54) DEVICES AND METHODS FOR PASSIVE FIBER CONTROL

(71) Applicant: UNIVERSITY OF NORTH TEXAS, Denton, TX (US)

(72) Inventors: Yijie Jiang, Corinth, TX (US); Nava Raj Khatri, Lubbock, TX (US)

(73) Assignee: University of North Texas, Denton, TX (US)

( * ) Notice: Subject to any disclaimer, the term of this patent is extended or adjusted under 35 U.S.C. 154(b) by 97 days.

(21) Appl. No.: 17/680,448

(22) Filed: Feb. 25, 2022

(65) Prior Publication Data

US 2022/0314516 A1  Oct. 6, 2022

Related U.S. Application Data

(60) Provisional application No. 63/170,861, filed on Apr. 5, 2021.

(51) Int. Cl.
*B29C 48/25* (2019.01)
*B29C 64/209* (2017.01)
*B33Y 10/00* (2015.01)
*B33Y 30/00* (2015.01)

(52) U.S. Cl.
CPC ...... *B29C 48/25684* (2019.02); *B29C 64/209* (2017.08); *B33Y 10/00* (2014.12); *B33Y 30/00* (2014.12)

(58) Field of Classification Search
CPC . B29C 48/25684; B29C 64/209; B33Y 10/00; B33Y 30/00
USPC ......................................................... 425/113
See application file for complete search history.

(56) References Cited

U.S. PATENT DOCUMENTS

| | | | |
|---|---|---|---|
| 5,196,212 A | 2/1993 | Knoblach | |
| 5,262,106 A | 11/1993 | Graham et al. | |
| 9,815,268 B2 | 11/2017 | Mark et al. | |
| 2016/0303779 A1 | 10/2016 | Kunc et al. | |
| 2017/0015061 A1* | 1/2017 | Lewicki | B33Y 10/00 |
| 2018/0200955 A1* | 7/2018 | Hoelldorfer | B33Y 30/00 |

(Continued)

FOREIGN PATENT DOCUMENTS

| | | |
|---|---|---|
| EP | 3152772 A1 | 4/2017 |
| WO | 2017156348 A1 | 9/2017 |

OTHER PUBLICATIONS

Nava Raj Khatri, "Passive Control of Fiber Orientation in Direct Ink Writing 3D printing," Thesis, University of North Texas, (Aug. 2020).

*Primary Examiner* — Nahida Sultana
*Assistant Examiner* — Lawrence D. Hohenbrink, Jr.
(74) *Attorney, Agent, or Firm* — Thomas | Horstemeyer LLP.

(57) ABSTRACT

Provided is an insert adapter for direct ink writing printers (DIW) and methods of fiber alignment in direct ink writing. The insert adapter is sized to fit snugly inside a print barrel DIW 3D printer. The adapter includes channels. The DIW printer with insert adapter, can be used in a passive method for microfiber alignment in DIW printing. The method includes feeding a non-Newtonian ink including microfibers through the print barrel such that the ink flows into the channels of the insert adapter before exiting through a print nozzle, causing the microfibers to align along the direction of ink flow.

7 Claims, 11 Drawing Sheets

(56) References Cited

U.S. PATENT DOCUMENTS

| | | | |
|---|---|---|---|
| 2019/0270240 A1* | 9/2019 | Wolf | B29C 64/106 |
| 2022/0079194 A1* | 3/2022 | Li | B33Y 80/00 |

* cited by examiner

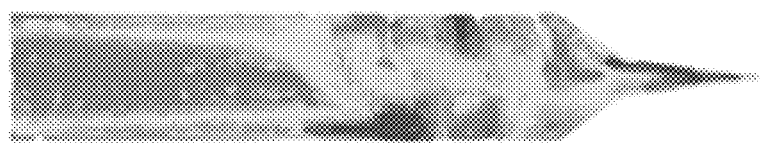
Fig. 3A No Helicoid
Fig. 3B P = 3 mm
Fig. 3C P = 7 mm
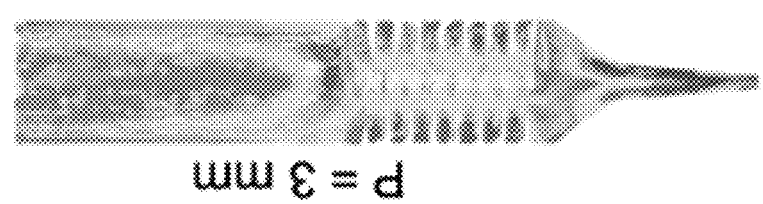
Fig. 3D P = 11 mm
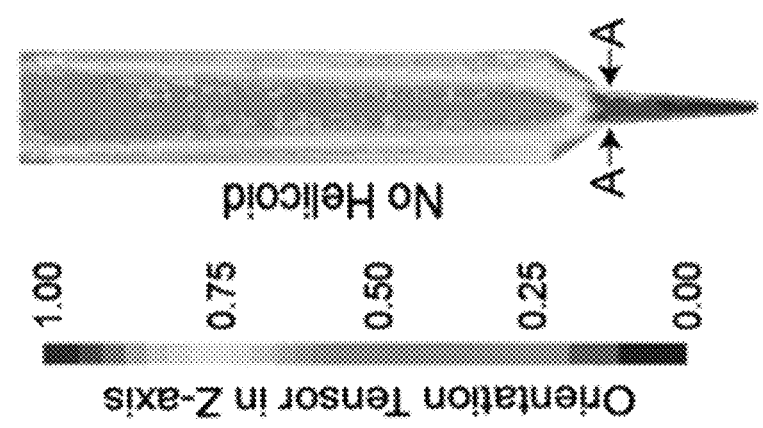
Fig. 3E GC Pitch

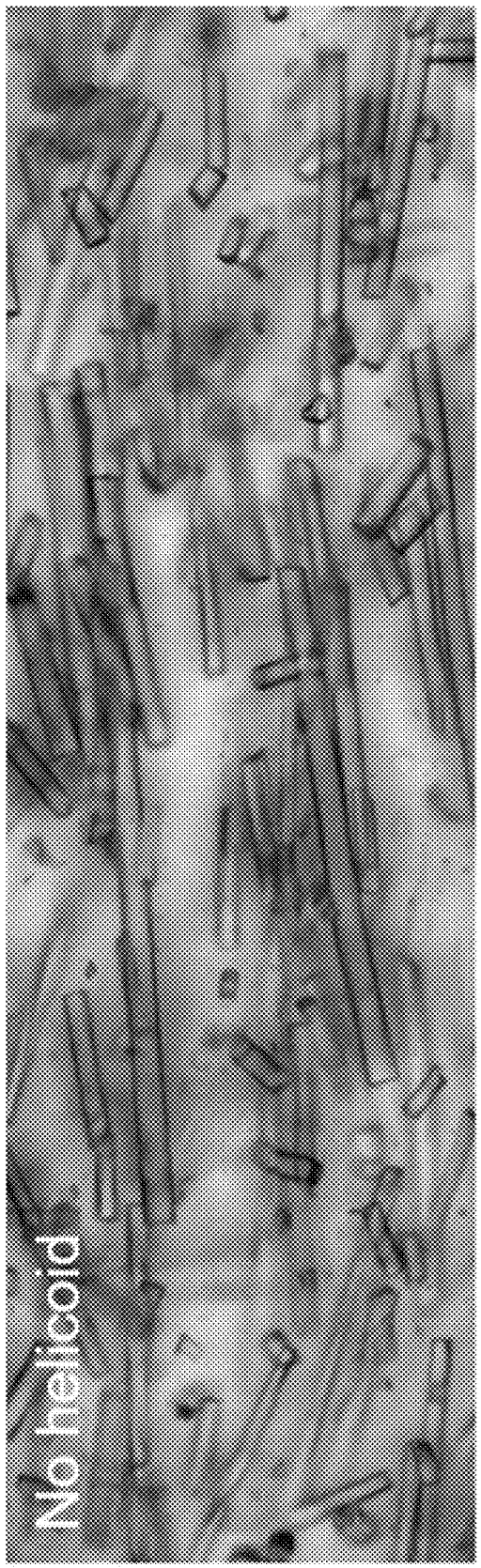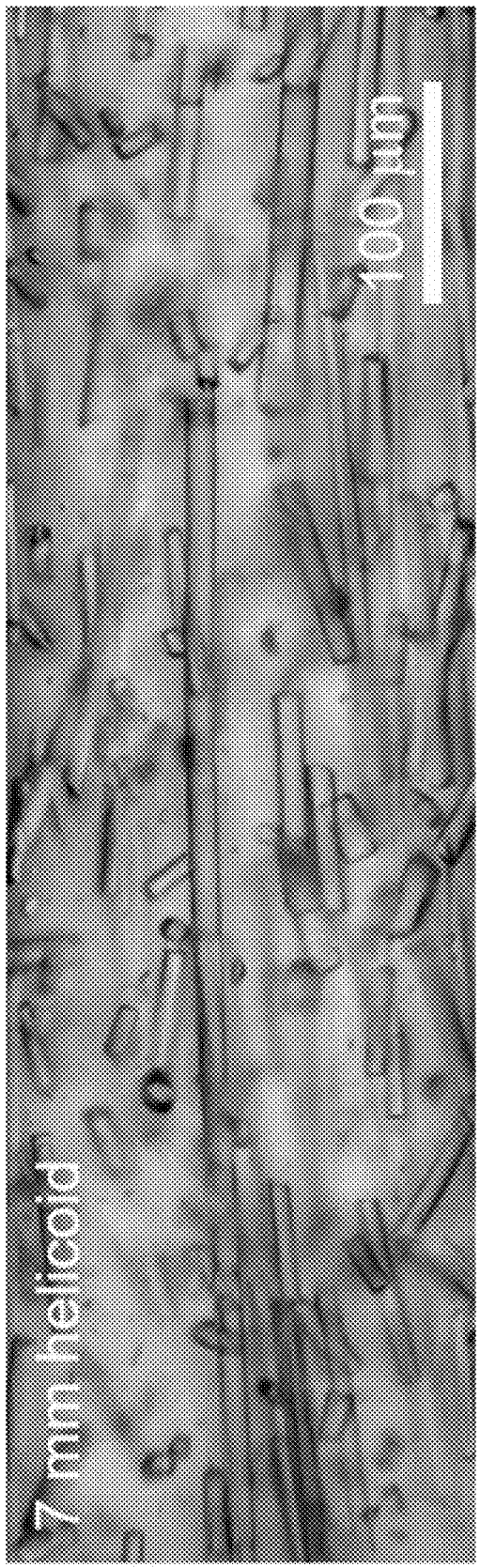
Fig. 5A

DEVICES AND METHODS FOR PASSIVE FIBER CONTROL

CROSS-REFERENCE TO RELATED APPLICATIONS

This application claims the benefit of and priority to U.S. Provisional Application Ser. No. 63/170,861, having the title "DEVICES AND METHODS FOR PASSIVE FIBER CONTROL", filed on Apr. 5, 2021, the disclosure of which is incorporated herein by reference in its entirety.

BACKGROUND

In recent years, 3D printing of fiber composites is receiving increased attention as an additive approach of fabricating lightweight, functional and high-performance materials. The material properties of fiber composites significantly depend on internal microstructures, including fiber orientation, distribution, and degree of alignment. Multiple strategies have been developed to integrate in 3D printing system for microstructural control. These strategies are usually active approaches, relying on additional control by mechatronics parts, magnetic and electric fields, or generating unstable flows inside narrow nozzles. Limitations of these methods include higher risk of clogging and need of extra parts in 3D printing.

SUMMARY

Embodiments of the present disclosure provide apparatus for direct ink writing printers, methods of fiber alignment in direct ink writing printers, and the like.

An embodiment of the present disclosure includes insert adapter for a direct ink writing 3D printer, wherein the insert adapter is sized to fit snugly inside a print barrel of a direct ink writing 3D printer.

An embodiment of the present disclosure also includes a passive method for microfiber alignment in direct ink writing 3D printing that includes inserting an insert adapter into a print barrel of a direct ink writing 3D printer, wherein the insert adapter comprises channels. The method further includes feeding a non-Newtonian ink including microfibers through the print barrel such that the ink flows into the channels of the insert adapter before exiting through a print nozzle. The shear force of the ink passing along the channels causes the microfibers to align along the direction of ink flow.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1C provides experimental observation of ink flow pattern entering the helicoid design, indicated by different colored inks. The flow front is measured along the interface between two inks, showing shear profile and guided flow direction by helicoid channel. FIG. 1D provides numerical simulation results showing fiber orientations along the helicoid channel. FIG. 1E shows surface to volume ratio and helix angle as a function of pitch size.

FIGS. 3A-3E show simulation results in accordance with embodiments of the present disclosure. FIG. 3A shows a schematic of overall model geometry and results of $1^{st}$ principal value of orientation tensor for: (FIG. 3A) no helicoid, (FIG. 3B) pitch size P=3 mm (FIG. 3C) P=7 mm (FIG. 3D) P=11 mm and (FIG. 3E) gradually changing (GC) pitch.

FIG. 4A shows an orientation tensor for different designs at the nozzle entry (section A-A), and FIG. 4B shows variation of the tensor distribution in different helicoid channels.

FIGS. 5A-5C show microstructure analysis in accordance with embodiments of the present disclosure FIG. 5A shows the comparison between fiber orientation in a 3D printed filament by a 400 mm nozzle size without and with a 7 mm pitch helicoid channel at the flow rate of 0.0034 $cm^3$/sec. FIG. 5B shows a probability of fiber orientation distribution for no helicoid and 7 mm pitch helicoid channel printed with 250 µm tip nozzle, and FIG. 5C shows a probability of fiber orientation distribution for no helicoid and 7 mm pitch helicoid channel printed with 400 µm tip nozzle.

Figure 1A:
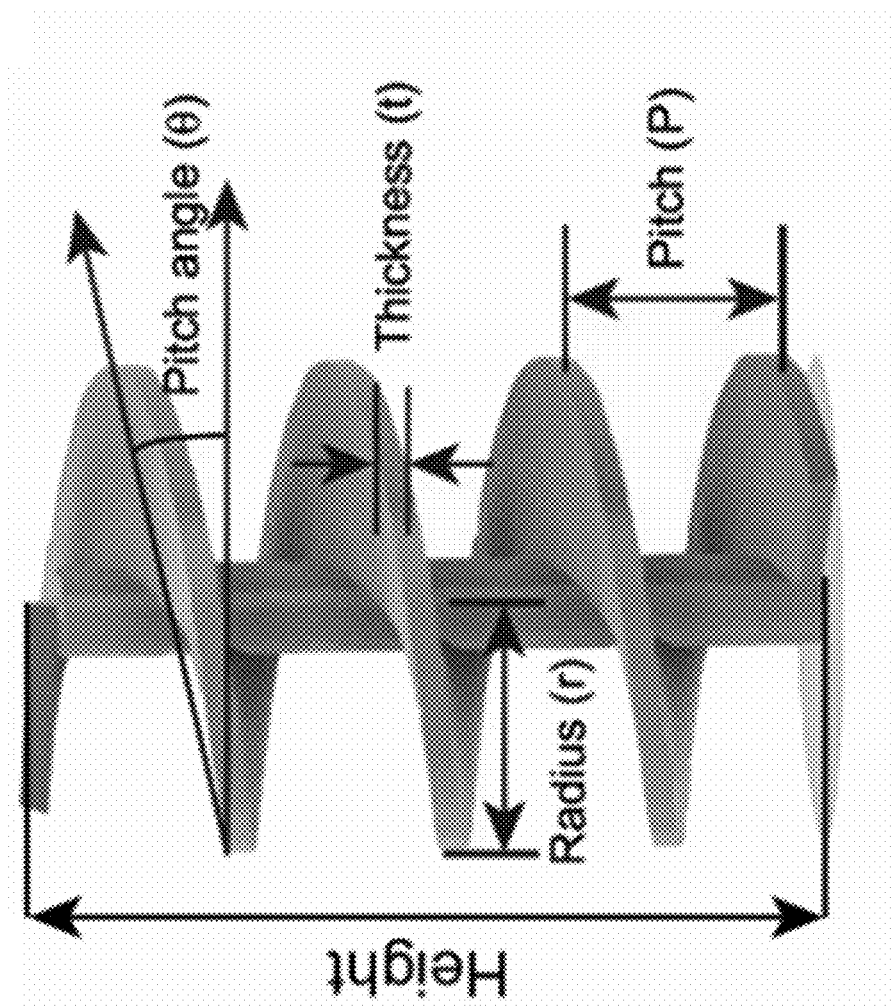
FIGS. 1A-1E show helicoid channels and implementations in accordance with embodiments of the present disclosure. Schematics of helicoid channels with (FIG. 1A) constant pitch size and (FIG. 1B) gradually changing pitch size are shown.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of mechanical engineering, material science, and the like, which are within the skill of the art.

The following examples are put forth so as to provide those of ordinary skill in the art with a complete disclosure and description of how to perform the methods and use the devices disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

GENERAL DISCUSSION

In accordance with the purpose(s) of the present disclosure, as embodied and broadly described herein, embodiments of the present disclosure, in some aspects, relate to devices and methods for passive fiber control in 3D printing.

In general, embodiments of the present disclosure provide for methods of passive fiber control and insert adaptors for passive fiber control.

The present disclosure includes an insert adapter for a 3D printer (e.g. a direct ink writing 3D printer), wherein the insert adapter is sized to fit snugly inside a print barrel of a direct ink writing 3D printer. A print barrel, as used herein can refer to an ink chamber, such as a syringe or other repository that leads to a nozzle on a 3D printer. The insert adapter can be made to size and can thus be used in any direct ink writing (DIW) printer.

Advantageously, the passive method of printing including an insert adapter as described herein does not require any moving parts or external control systems. In some embodiments, the 3D printable ink can comprise such as polydimethylsiloxane (PDMS) and glass fibers (GF). In other embodiments, the ink can comprise other materials and fibers combined to form a non-Newtonian fluid as can be envisioned by one of ordinary skill in the art. The ink can comprise such as epoxy, hydrogel, or starch and fibers such as carbon fibers, cellulose fibers, or cotton fibers.

The insert adapter and methods including the insert adapter can guide the ink flow through the print barrel and provide pre-alignment of fibers before the ink flows into the narrow nozzle space.

Advantageously, the insert adaptors described herein can be manufactured from a variety of materials, including ceramic, metal, or various polymers. The insert adapter can be printed on a 3D printer, including through stereolithography and fused deposition modeling. The insert adaptor can thus be manufactured cheaply, and can be sized to fit any existing 3D printer.

In various embodiments, the insert adapter is sized to fit snugly inside a print barrel of a direct ink writing 3D printer and comprises at least one channel, such that the ink flows along the one or more channels into the print nozzle. In some embodiments, the insert adapter comprises a helicoid channel forming threads similar to a screw and a center post. The helicoid channel can have a constant pitch between threads or a variable pitch between threads. In embodiments having a constant pitch, the pitch can be about 3 mm to 11 mm. The threads can have a helix angle of about 3.41° to 12.34° or about 7.92° to 10.15°. In other embodiments, the helicoid channel can have a gradually decreasing pitch between threads. The starting pitch can be about 2.5 times to 1.5 times larger than an ending pitch. For example, the starting pitch can be about 15 mm at the inlet end (e.g. the top of the barrel) and the ending pitch can be about 7 mm at the outlet end (e.g. the nozzle end).

Other channel patterns can be used. The shear force of the ink flow through the channels causes the fibers to align. For example, in some embodiments, the insert adapter can have a frustoconical shape in which the channels are formed from concentric slots. In other embodiments, the insert adapter can be disc shaped having channels formed from holes (e.g. circular holes). The holes can be identically sized or variably sized.

In some embodiments, the insert adapter as described herein can be provided as a barrel including the channel patterns. In this embodiment, the print barrel can be a barrel with an adapter or can be manufactured as a single piece. The print barrel with channels can be substituted for the existing print barrel on a DIW printer.

Embodiments of the present disclosure include a methods for aligning fibers (e.g. microfibers) including an insert adapter as above, wherein the method can include inserting the insert adapter into a print barrel of a direct ink writing 3D printer and feeding a non-Newtonian ink comprising microfibers through the print barrel such that the ink flows into the channels of the insert adapter before exiting through a print nozzle. The shear force generated by the ink passing along the channels causes the microfibers to align along the direction of ink flow. The properties of the ink can be tuned by increasing or decreasing the degree of fiber alignment in the ink. Such tuning can be controlled by selecting an insert adapter having channel architecture that provides desired properties to the ink. When compared to ink printed without the insert adaptor, the stiffness can be increased by up to about 78% and the tensile strength can be increased by up to about 48%. Microfibers, as used herein, can refer to fibers having an average diameter from about 1 micron to about 100 microns. The size of fibers aligned with the adapter can be scaled based on nozzle size. For example, the printable fiber size can be about 10% or less of the nozzle diameter.

Additional tuning can be performed by adapting the properties of the ink (e.g. the size and/or volume of fibers and/or varying the base material). The channels of the adapter can be optimized to generate desired strength and stiffness properties based on both the printer barrel and the ink properties.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Fiber-reinforced composites are of enormous importance in broad applications, including lightweight structures, aerospace, automotive, and impact protections. With the development of additive manufacturing, a variety of 3D printable fiber composites have been developed, ranging from soft biomaterials, elastomers, tough polymer to stiff ceramics and metals, with advanced material properties and functionalities. Distinct from other 3D printing methods, direct ink writing (DIW) is an extrusion-based technique that can print non-Newtonian materials (inks) at room temperature and ambient condition. The microstructure of the printed materials, such as fiber composites, can be controlled by the shear induced between extruding channel and nozzle walls and the ink flow.

The mechanical properties of fiber-reinforced composites depend on both the intrinsic mechanical properties of constituent components and the internal microstructures (e.g. fiber orientation and fiber geometries). For example, the stiffness and tensile strength significantly depend on the orientation of fibers and is highest with fiber oriented in the loading direction, while they are lowest when loaded in the transverse direction [8,17]. Since the degree of fiber alignment can significantly influence the mechanical properties of the printed composites [7,18], previous studies have explored various ways, both active and passive approaches, to control the degree of fiber alignment to achieve desired and controllable mechanical behaviors [18-22]. In active approaches, external mechatronic and control systems are required to be integrated with 3D printing systems. For example, Ober et al. [21] investigated an active mixing method of complex fluids by using an impeller-based mixing print nozzle. In-situ mixing of two streams of silicone-based inks, one without filler and another with suspended polystyrene fillers was demonstrated, enabling multimaterial printing and control of local compositions. Kokkinis et al.[19] controlled the alignment of anisotropic fibers preloaded with magnetic particles by an application of magnetic fields. A mask of the desired pattern is used during the curing process for the positional control of the local orientation. The printed composites exhibit desired anisotropic mechanical and electrical property, and shape-changing behaviors. Raney et al. [18] implemented a rotating nozzle system controlled by an external motor, combining rotational and linear translation during manufacturing process. The fiber orientation can be varied locally to form heterogeneous and helical microstructures, and thus resulted in highly tough and damage-tolerant fiber composites.

Instead of introducing external moving parts and electronics, passive control harnesses the shear-induced fiber orientation as the ink flows through channel and nozzle. One strategy is to intentionally introduce geometrical variations in nozzle cross sections [20,22]. When extruding fiber filled inks, the variations in nozzle cross section led to local unstable flow and, therefore, resulted in fiber randomness and isotropic mechanical properties compared to the composites with aligned fibers.

To achieve efficient fiber orientation control, most approaches, both active and passive ones, take place inside the narrow space near extrusion (several tens to hundreds of micrometers), where strong interactions between ink and nozzle wall exist. This, however, limits maximum fiber fraction in fabricated composites and raises the risk of clogging, which limits geometric accuracy and part fidelity and even forces the 3D printing process to stop. [23,24]

In this work, we leverage a passive method to control microfibers in a pre-aligned way by integrating designed helicoid channels in DIW 3D printing process. Polydimethylsiloxane (PDMS) and glass microfiber (GF) composites are printed and process-structure-property relationships are investigated via mechanical testing, microstructural analysis, and numerical simulations. While the composite inks flowing through the designed channels, the fibers are automatically aligned in the flow direction because of the induced shear stress between the inks and the channel walls. The pre-alignment occurs before entering the narrow nozzle, avoid increasing risk of clogging and sacrificing maximum fiber fraction that can be printed. The effect of helicoid channels with constant pitch size ranging from 3-11 mm (3.41-12.34° helix angle) and gradually changed pitch size from 7 to 15 mm on fiber alignment are studied. It is found that both the helicoid surface area to volume ratio and helix angle affect significantly on the pre-alignment of fibers. The helicoids with 7-9 mm pitch (7.92-10.15° helix angle) lead to increments up to 77.6% and 47.8% on stiffness and tensile strength, respectively, for 3D printed specimens. Numerical simulations show a lower variation of fiber orientations using these channels at the nozzle entry. This indicates that more uniform the pre-alignment of fibers is, the higher stiffness and tensile strength are. Such a passive method via designed channels does not require any moving parts or external control systems and can be extended to other fiber composites systems for broad applications.

Methods and Materials

Inks Formula

The printing materials are polydimethylsiloxane (PDMS, Dow Chemicals®) and glass microfibers (FiberGlast® #29). The glass fibers have an average width of 11.3±2.4 μm, measured from the collected microscopic images using ImageJ software. For the ink preparation, two types of PDMS (Dowsil SE1700® and Sylgard 184®) are used in 85:15 proportion as the base and their corresponding cross-linkers, in 10:1 proportion, as the curing agent. These two types of PDMS have different viscosities so that the mixture results in a printable rheology for the ink [12,25]. Glass fibers (volume fraction ranging from 6% to 21%) are added into the resin and mixed in a Flacktek® DAC 400.2 VAC Speedmixer at 1800 rpm for 1:45 minutes. Then the mixture is transferred into the syringe with or without the channel designs, followed by a centrifuge process in an Ohaus® FC5706 centrifuge machine at 4000 rpm for 3 minutes to remove micro air bubbles and condense the ink. A Nordson® polyethylene nozzle is attached to the syringe by Luer lock for 3D printing.

Helicoid Channels

The helicoid channels are designed in Fusion 360® with constant and gradually changing pitch sizes. The constant pitch sizes range from 3 to 11 mm and the gradually changing pitch size varies from 15 mm at inlet to 7 mm at outlet. The outer diameter of the helicoid is 16 mm, total height is 25 mm, and the thickness of the plank is 1 mm. A solid shaft of diameter 4 mm in the center is added to prevent the leakage of ink through the central line without flowing along the helicoid flank. The designed channels are 3D printed using by a MakerGear® M2 printer with polylactic acid (PLA). For the slicing purpose, the open-source slicing software, Slic3r®, is used and for an interfacing software, Repetier-Host® V2.1.6 is used for 3D printing control.

DIW 3D Printing System

A customized DIW 3D printing system is integrated in a MakerGear® M2 printer. For the DIW printing, Nordson® Optimum 10 cc syringes and polyethylene micro nozzles are used. The tip inner diameters can be 200 to 1600 μm, where 250 and 400 μm nozzles are used here. The volumetric control system is Nordson Ultimus IV Dispenser with a displacement-controlled piston. The printing speed is kept constant at 30 mm/s with a constant volume flow rate according to the nozzle size and printing speed, i.e., V=fvA, where v is the printing speed, A is the cross-sectional area of nozzle tip, and a prefactor f is ranging from 0.8 to 1.2 to compensate the die swelling behavior during extrusion. Here, f=0.92 is experimentally determined for optimal printing of PDMS-GF inks. The layer thickness is set to be 0.7 times of the nozzle diameter. The G-code is customized for printing the tensile samples with 5 layers with the printing path along the longitudinal direction. After 3D printing, the samples are cured at 100° C. for 30 minutes in a closed furnace.

Microstructure Analysis

The microstructural characterization is performed to determine the degree of fiber alignment in a printed filament quantitatively. An AmScope® microscope is used for imaging, followed by image analysis using an open-source image processing software, ImageJ. The microscopy images are converted into 32-bit images in ImageJ and analyzed by the OrientationJ plugin [26-28]. Fiber orientation analysis and distribution function are generated by OrientationJ plugin, with the local window of 10-30-pixel in Gaussian filter for plots of orientation color contour and its distribution.

Tensile Tests

For the mechanical properties measurements, the tensile tests are performed on a Shimadzu® Universal Testing machine with the stroke rate of 50 mm/min, which is equivalent to 0.008 s$^{-1}$ strain rate. Engineering stress and strain curves are calculated based on force-displacement experimental data based on initial cross section area and gauge length. Stiffness, i.e., the initial slope of stress-strain curves, and ultimate strength of composites are reported. The tensile tests are repeated at least three times for each kind of specimen.

Simulations of Fiber Orientation

The simulations of fiber orientation are performed using Autodesk® Moldflow. 3D models designed on Fusion360® software with and without helicoid channels are used. For material model, a Williams-Landel-Ferry (Cross-WLF) viscosity model [29] is fitted from rheology experimental data [6] on a similar composite system, namely PDMS and glass fiber composites. The viscosity $\eta$ is given by the following equation, $$\eta = \frac{\eta_0}{1+\left(\frac{\eta_0 \dot{\gamma}}{\tau^*}\right)^{1-n}} \quad (1)$$

where $\eta_0$ is the viscosity of the ink at zero shears, $\dot{\gamma}$ is the shear rate applied on the ink, $\tau^*$ is the shear stress at the transition from Newtonian to shear-thinning and n is the power-law index.

The fitting (equation 1) captures the shear thinning behavior of the ink and results in zero-shear viscosity $\eta_0$=113.3 kPa·s, n=0.0975 and $\tau^*$ is 235.816 Pa from the experimental data. The volume flow rate is set at 0.013 cc/sec. The glass fibers are set to have initial length of 120 μm and length to radius aspect ratio of 25. The fractions of fibers are 12 wt % and 6 wt %. The elastic modulus of the fiber is 72 GPa and the density of glass fiber is 2.4 g/cm$^3$. To simulate the experiments, the 3D models have a same dimension as the actual syringe, where diameter and length are 16 mm and 70 mm, respectively. The height of the taper section is 8 mm with an angle of 34.5° and nozzle length is 23 mm.

The fiber orientation is calculated based on the Folgar-Tucker model [30]. This model assumes fibers as rigid cylinders with uniform length and diameter and considers that the center of the mass is distributed randomly. In Folgar-Tucker model [30], the orientation angle $\Phi$ and its probability distribution function $\psi_\Phi$ are $$\frac{\partial \psi_\Phi}{\partial t} = C_I \dot{\gamma} \left( \frac{\partial^2 \psi_\Phi}{\partial \Phi^2} \right) - \frac{\partial}{\partial \Phi}\left[ \psi_\Phi \left( -\sin\Phi\cos\Phi \frac{\partial v_x}{\partial x} - \sin^2\Phi \frac{\partial v_x}{\partial y} + \cos^2\Phi \frac{\partial v_y}{\partial x} + \sin\Phi\cos\Phi \frac{\partial v_y}{\partial y} \right) \right] \quad (2)$$

where $C_I$ is the interaction coefficient and $$\frac{\partial v_x}{\partial x}, \frac{\partial v_x}{\partial y}, \frac{\partial v_y}{\partial x}, \frac{\partial v_y}{\partial y}$$

are the velocity gradients of the flow. An orientation tensor is defined based on distribution function in Folgar-Tucker model [31], $$a_{ij} = \int \psi_\Phi(\Phi) p_i p_j d\Phi \quad (3)$$

where $a_{ij}$ is the orientation tensor of a fiber, p is the unit vector for a single fiber orientation. The degree of fiber alignment is evaluated by the principal values of this tensor.

Results and Discussion

3D Printing with Helicoid Channels

Figure 1B:
Figure 1D:
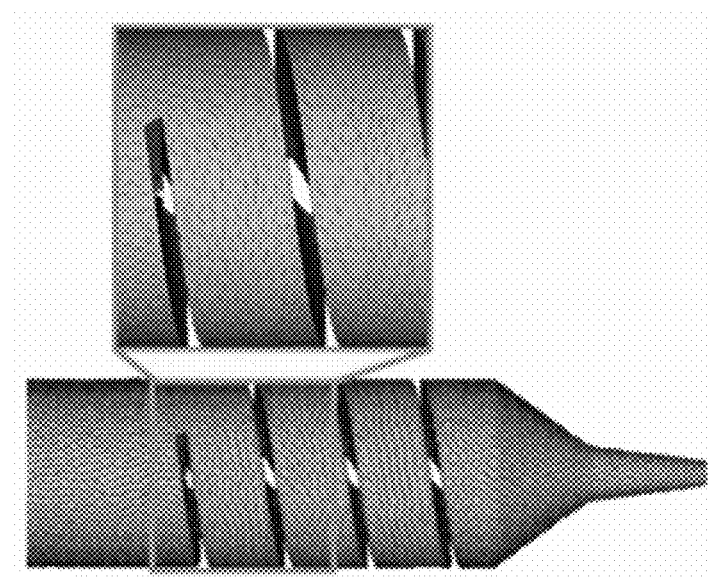
Figure 1C:
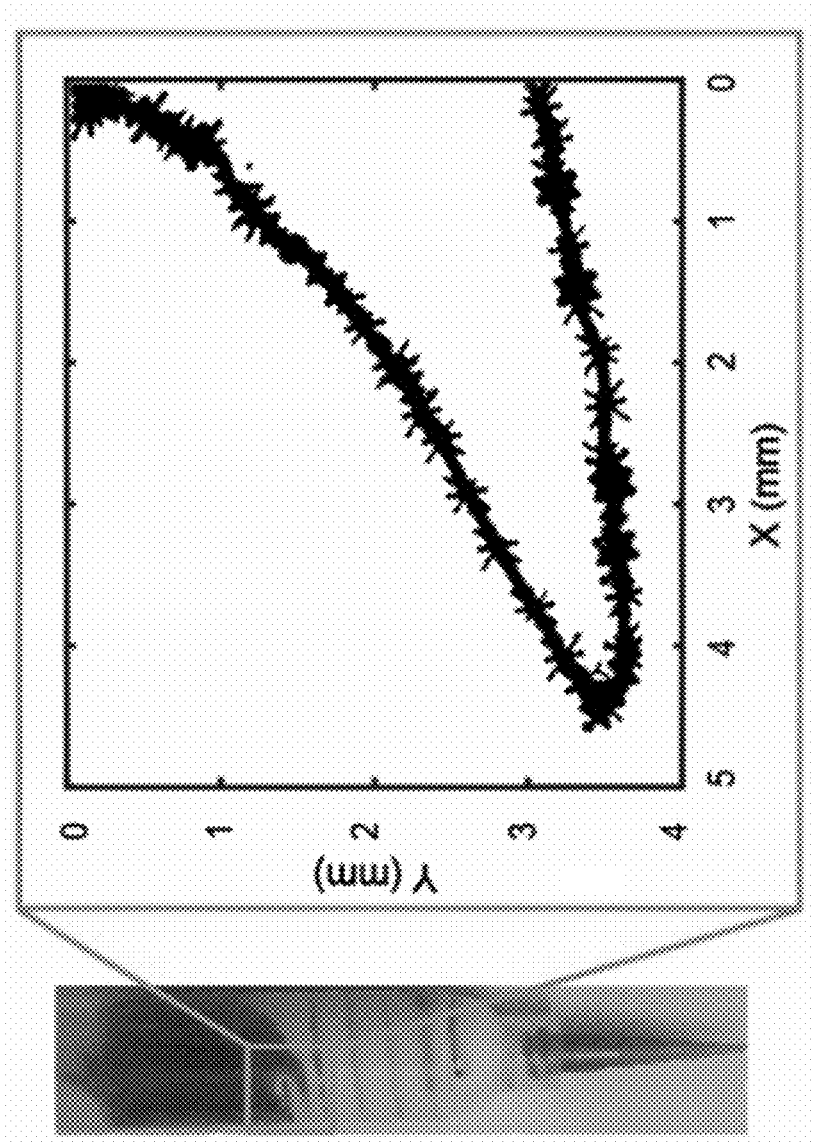
Figure 1E:
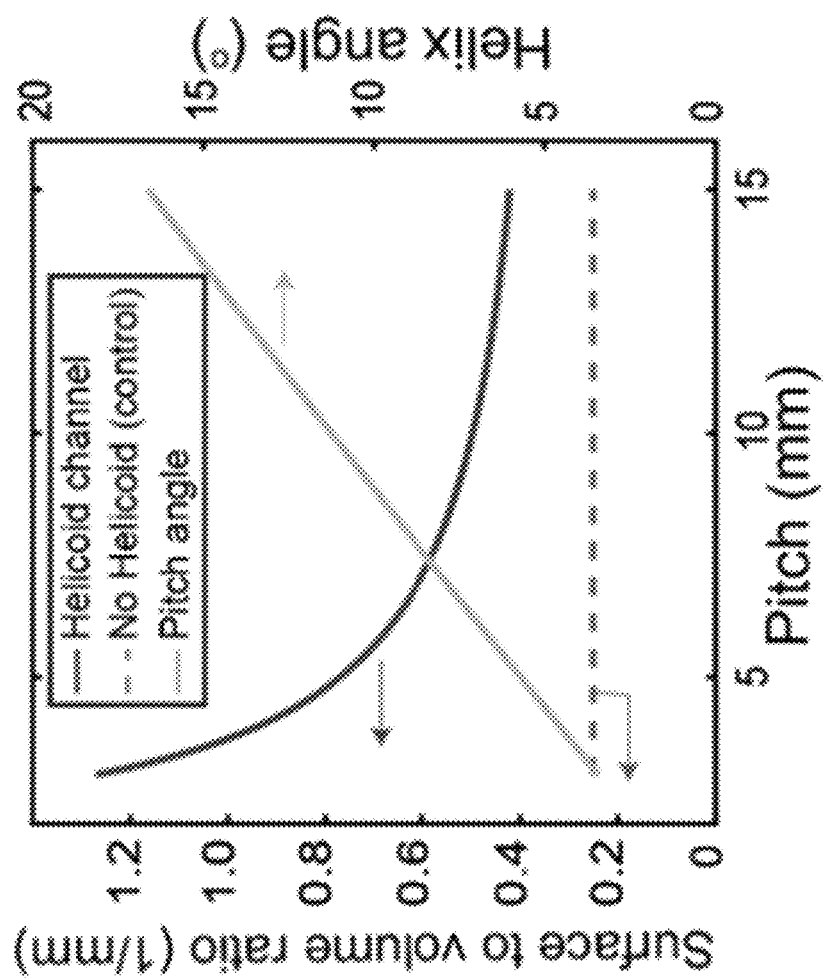

The surface area of the helicoid and syringe in contact with the ink contributes to the induced shear stress. The higher the surface area to volume ratio is the higher is the area in contact with the printing ink. The surface area of the helicoid in contact with the ink is evaluated for different pitch sizes. FIG. 1A shows the helicoid design with the part nomenclature, FIG. 1B shows a variable pitch helicoid and FIG. 1E shows the relation between the pitch size, surface area and the volume of exposure calculated based on equation 4-6. The surface area of a helicoid [32] and the area of syringe in contact with ink is given by equation 4.

$$A = N\left(r\sqrt{(p^2 + (2\pi r)^2)} + \frac{p^2}{2\pi}\ln\left(\frac{2\pi r + \sqrt{(p^2 + (2\pi r)^2)}}{p}\right)\right) - 2\pi r N t + 2\pi r h \quad (4)$$

where N is the number of turns, p is the pitch size, and r is the radius of the helicoid. The parameters of the helicoid are, r=8 mm, pitch ranging from 3 to 11 mm, and N related to pitch as N=h/p. where t=1 mm is the thickness of the flank and h=25 mm is the total height of the helicoid. The first term of the equation gives the surface area of the top surface of the flank, the second term gives the area of the cross-section along the thickness of the helicoid for N number of turns with t thickness, and the third term of the equation gives the surface area of the syringe wall not covered by the helicoid within height h. The volume of ink that flows through the helicoid is $$V = \pi r^2 h - A t \quad (5)$$

The ink volume is the free space as the difference of syringe volume for height h and volume of the helicoid. FIG. 1E shows the relation between the ratio of surface area that ink meets during the flow to the volume of the ink (surface to volume ratio) and the relation between the pitch size and the helix angle of the helicoid. The control line in the plot is the surface to volume ratio for the case without the helicoid. The ratio is decreasing with a reduced slope as a function of increasing pitch sizes. The pitch size and the helix angle are related by the relation, $$\theta = \tan^{-1}\left(\frac{p}{2\pi r}\right) \quad (6)$$

where, $\theta$ is the helix angle.

The surface to volume ratio decreases significantly as a function of pitch increment, with a high area/volume ratio a strong influence of the helicoid to the fiber alignment is expected. Meanwhile, the angle of the helicoid increases with pitch (FIG. 1B). The larger angle will result in a smoother flow at the entry and the exit of the helicoid channel so a smooth ink flow at the entrance of the nozzle, leading to better alignment. With this relation between the pitch and area/volume ratio, therefore, a trade-off between the surface to volume ratio and the angle is seen and an optimal pitch size should be found to achieve optimal mechanical properties. FIG. 1C shows the pattern of fluid flow inside the helicoid channel. Two different pigments are used to visualize the flow pattern, the initial flow of the green pigment ink inside the channel shows that the ink flow along the helicoid angle with higher central velocity.

FIG. 1C shows the velocity pattern of the fluid entering the helicoid. The 2 different pigmented ink are used to observe the flow pattern of the ink inside the helicoid. The x-y plot shows the fluid displacement in x and y direction just after the ink enter the helicoid. It can be observed from FIG. 1D, obtained from the numerical simulation, that the flow pattern in FIG. 1C causes the fiber to align along the ink flow direction which is controlled by the helix angle of the helicoid. As the fluid flow further along the helicoid flank the fiber tends to increase the alignment along the flow direction.

The pre-alignment of the fiber entering the nozzle was also supported by an experiment to determine the printability of maximum fiber volume fraction ink. The 7 mm pitch helicoid integration increased the printability from 18 vol % to 21 vol % fraction with 400 μm nozzle.

Mechanical Properties

Figure 2B:
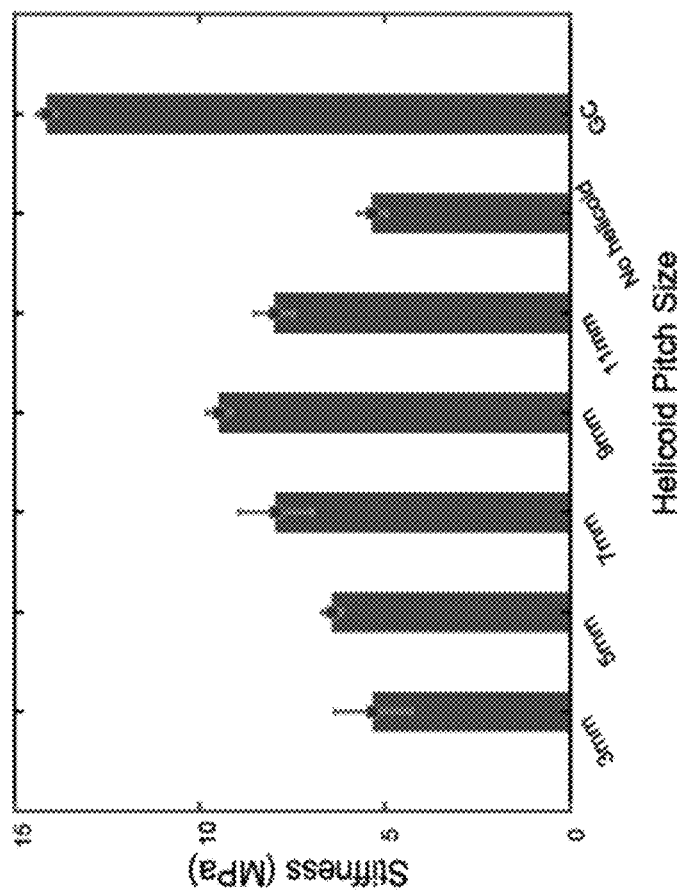
FIGS. 2A-D show results of tensile tests on 3D printed composites in accordance with embodiments of the present disclosure. Tensile strength (FIG. 2A) and stiffness (FIG. 2B) of the samples printed with 6 vol % fiber using no helicoid, different constant pitched helicoids, and gradually changing pitched helicoid channels, respectively. Tensile strength (FIG. 2C) and stiffness (FIG. 2D) of the samples printed with 12 vol % fiber.
Figure 2A:
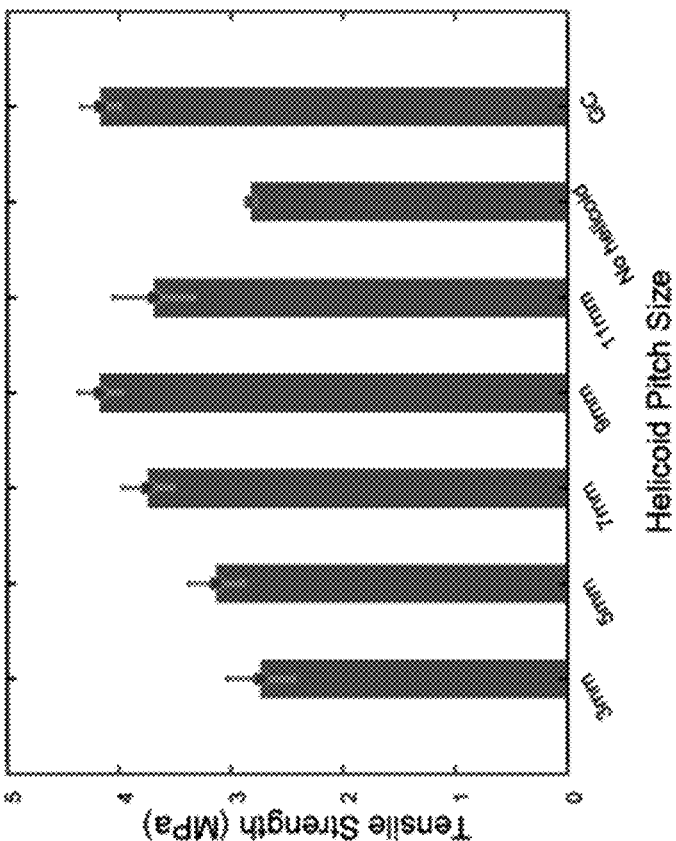
Figure 2C:
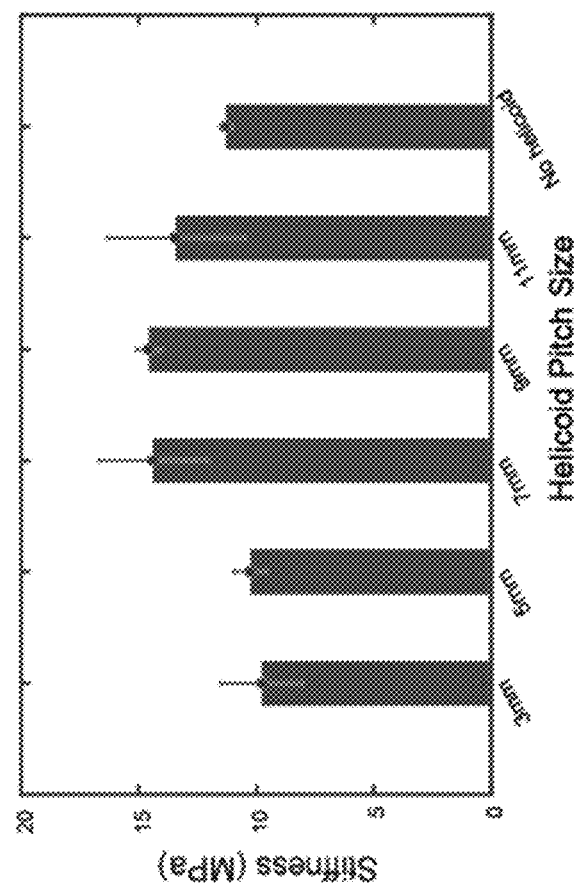
Figure 2D:
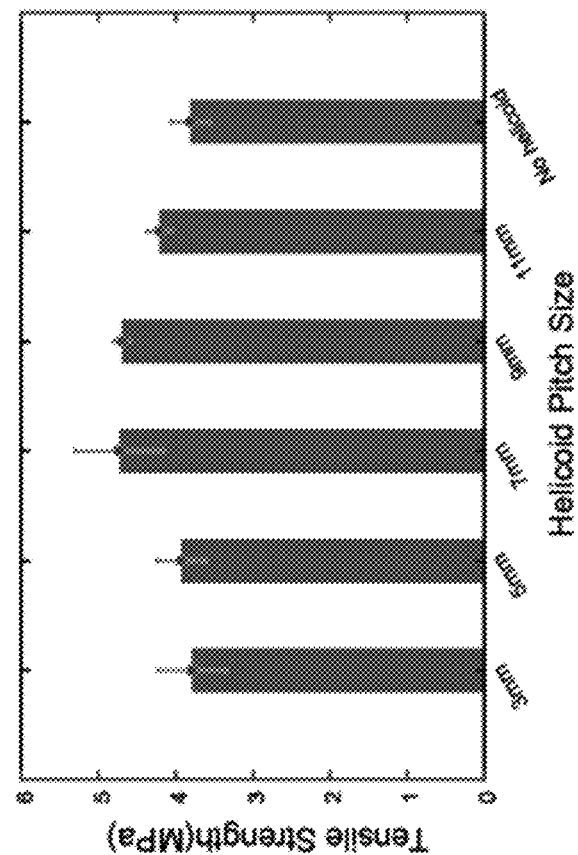

Tensile testing is performed on 3D printed PDMS-glass fiber samples with 6 and 12 vol % fibers using 400 μm nozzle. For 6 vol % fiber specimens, both the strength and stiffness increase with an increasing pitch size of the helicoid till the pitch size is 9 mm, after which the properties are decreasing (FIGS. 2A, 2B). The highest strength is 4.17±0.36 MPa and the highest stiffness is about 10 MPa. The strength increment compared with that of samples without helicoid channel is by 47.8%. For stiffness, the 9 mm pitch helicoid channel has the optimal stiffness, which is 77.6% higher than no-helicoid channel. Similar trends are observed for 12 vol % fibers samples as shown in FIGS. 2C and 2D. The maximum tensile strength and stiffness are found in the samples printed by 7-9 mm pitch sized channels. The increment in the tensile strength and stiffness compared to non-helicoid samples are 25% and 27.3%, respectively. Using the gradual pitched channel, the strength and stiffness can be further tuned up to about 4.2 MPa and 14.5 MPa, respectively.

Although the surface area to volume ratio is higher for channels with smaller pitch (size below 7 mm), the tensile strength and stiffness of printed samples are lower. This indicates a trade-off effect between the area-volume ratio and the helix angle (FIG. 1E). The fluid exiting from the helicoid tries to flow along the helix angle even after exiting the helicoid, as the low helix angle causes the fluid to flow toward the syringe wall instead of flowing downward. This causes a randomization of the fiber alignment resulting in low pre-alignment.

Simulation Results

Due to the difficulties in experimentally observing the fiber orientation inside the channel and nozzle entry, simulations are performed to obtain the local fiber orientation and evaluate the effect of helicoid channels on orientation control.

FIGS. 3A-3E show the color shaded plots of the orientation tensor at the center of the midplane of the syringe. FIG. 3A is the base model (no helicoid) for the simulation and FIGS. 3B-3E are fiber orientation tensor results of models with P=3 mm, 7 mm, and 11 mm helicoids, and GC pitch respectively. A similar simulation is done for P=5 mm and P=9 mm. The orientation tensor shown is at the end of the simulation i.e. after the ink is solidified. The tensor distribution is non-uniform across the cross-section at the nozzle entry for all the cases. For the no helicoid case, the orientation tensor distribution remains symmetric due to the geometry of the syringe with a higher degree of alignment at the center of the nozzle (FIG. 3A). For the cases with helicoid channels, non-symmetric orientation distribution is found. As shown in FIGS. 3B-3E, the fibers align better at one side of the wall (at the side of the helicoid end).

Figure 4B:
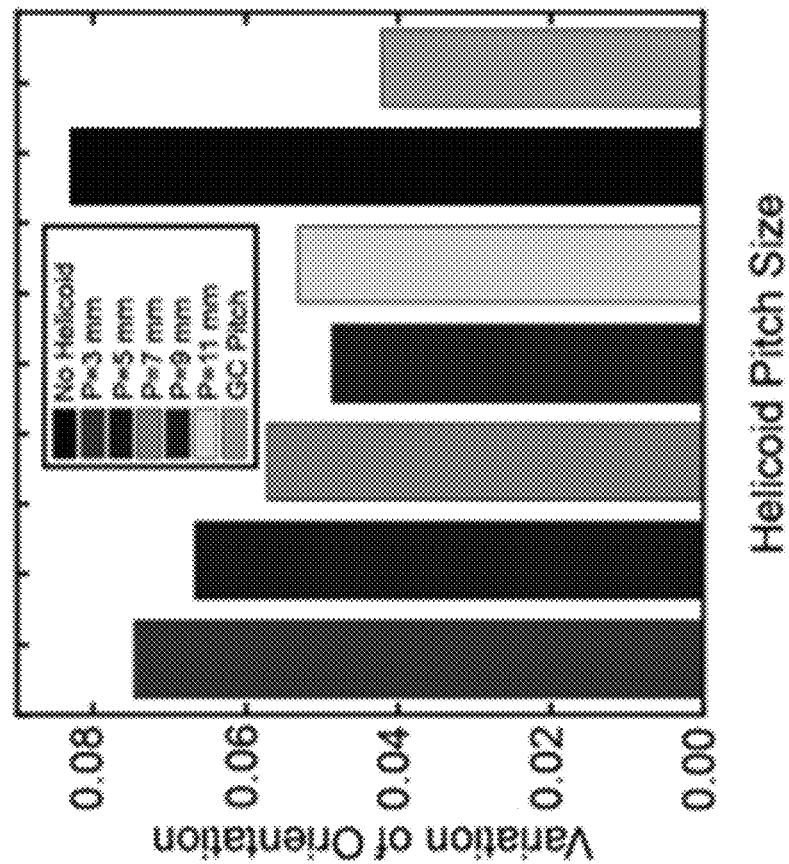
FIGS. 4A-4B show orientation tensor distributions at entry of the nozzle in accordance with embodiments of the present disclosure.
Figure 4A:
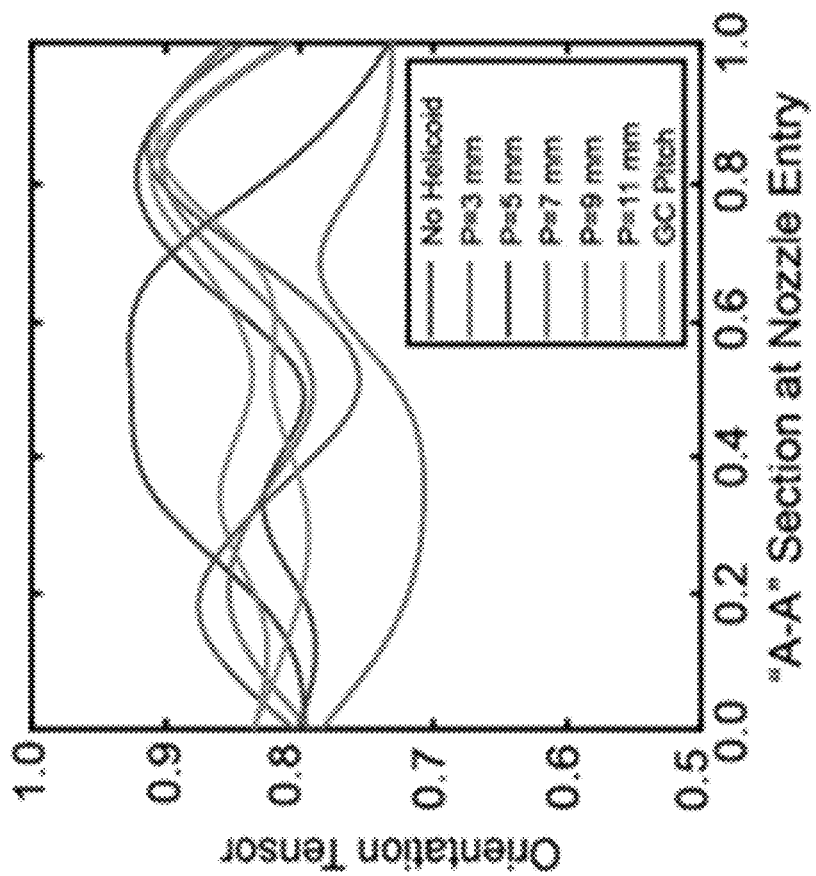

FIG. 4A is the plot of the of orientation tensor in the $1^{st}$ principal direction at the nozzle entry (A-A). This section (A-A), shown in FIG. 3A, is referenced as the entry of the nozzle, where the pre-alignment of fibers is observed and compared across different helicoid designs.

Ten data points along the section A-A are extracted and plotted against the normalized diameter of the nozzle entry. These curves show different pre-alignment of fibers caused by designed helicoids. Each data point indicates the local fiber alignment, and the fluctuation of each curve indicates the non-uniformity of fiber orientation. To evaluate the uniformity of fiber orientation in different cases, the standard deviation of each case is shown in FIG. 4B. The variation of fiber orientation decreases as the pitch size increases from 3 mm to 9 mm, then increases as the pitch size increases to 11 mm. The variation in the case without a helicoid has a value larger than 0.04643. Compared with the mechanical properties of the printed composites (FIGS. 2A-2D), it indicates a structure-property relationship that the more uniform pre-alignment of fibers (lower the variation), the higher the stiffness and strength are. The standard deviation for 9 mm pitch helicoid is 46.6% lower than the variation of orientation tensor for no-helicoid model.

Microstructural Characterizations

Figure 5C:
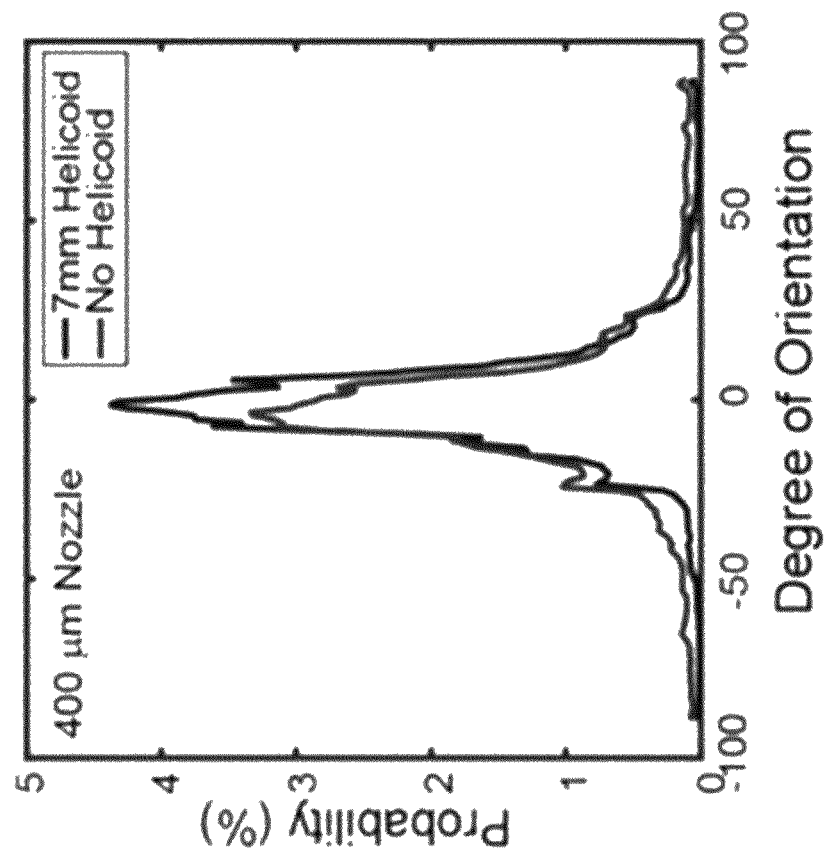
Figure 5B:
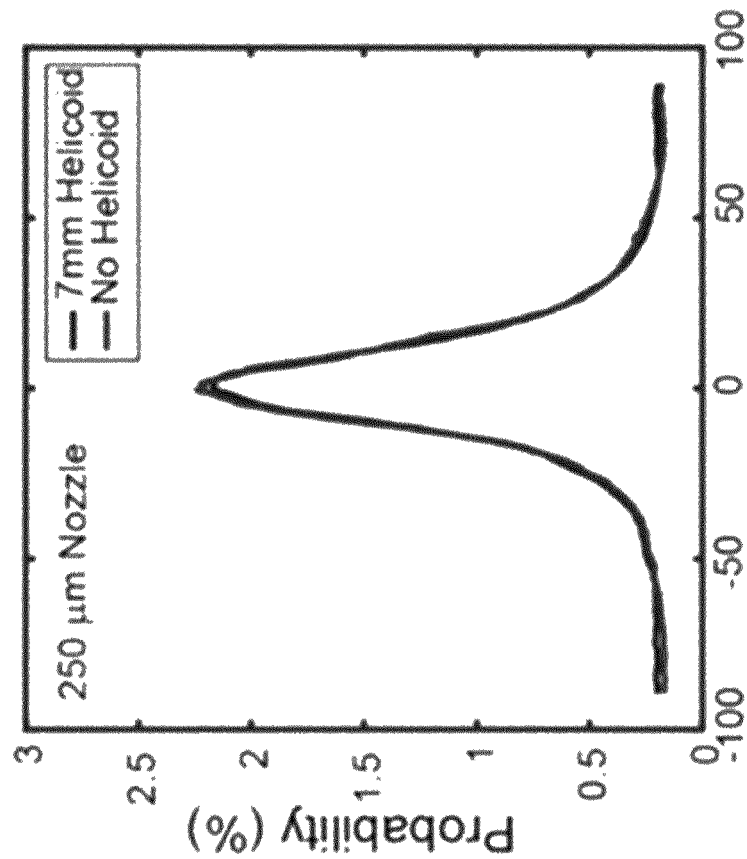

To understand the process-structure relations, microstructural characterizations are performed on 3D printed filaments using different channels and nozzles. FIG. 5A shows an orientation color map overlapping with fibers in an extruded filament by 400 μm nozzle and 7 mm pitched channels as an example. The color indicates the orientation of each individual fibers against the printing direction. The microstructure of the extruded filament from 7 mm pitch helicoid is compared with the fiber orientation of the sample without a designed channel. Orientation analysis of the microfibers in extruded filaments using 400 μm and 250 μm nozzles, respectively, are shown in FIGS. 5B-5C. FIG. 5B shows that the probability of orientation distribution curve for the sample with 7 mm pitch helicoid is more concentrated near the zero-degree indicating that more fibers are aligned in the printing direction for the 7 mm pitch helicoid compared with the no-helicoid one for samples printed with 400 μm nozzles. In FIG. 5C, the probability of orientation distribution of the fiber is similar for 7 mm pitch helicoid and without helicoid (250 μm nozzle). The shear inside such a small nozzle dominant the fiber alignment and does not show the influence of pre-alignment at the nozzle entry.

EXAMPLE 1 REFERENCES

[1] Tang S, Hu C. Design, Preparation and Properties of Carbon Fiber Reinforced Ultra-High Temperature Ceramic Composites for Aerospace Applications: A Review. J Mater Sci Technol 2017; 33:117-30. https://doi.org/10.1016/j.jmst.2016.08.004.
[2] Mohammed L, Ansari M N M, Pua G, Jawaid M, Islam M S. A Review on Natural Fiber Reinforced Polymer Composite and Its Applications. Int J Polym Sci 2015; 2015:243947. https://doi.org/10.1155/2015/243947.
[3] Chandra R, Singh S P, Gupta K. Damping studies in fiber-reinforced composites—a review. Compos Struct 1999; 46:41-51. https://doi.org/10.1016/S0263-8223(99)00041-0.
[4] Rajak D K, Pagar D D, Menezes P L, Linul E. Fiber-reinforced polymer composites: Manufacturing, properties, and applications. Polymers (Basel) 2019; 11. https://doi.org/10.3390/polym11101667.
[5] Sydney Gladman A, Matsumoto E A, Nuzzo R G, Mahadevan L, Lewis J A. Biomimetic 4D printing. Nat Mater 2016; 15:413-8. https://doi.org/10.1038/nmat4544.
[6] Jiang Y, Korpas L M, Raney J R. Bifurcation-based embodied logic and autonomous actuation. Nat Commun 2019; 10:1-10. https://doi.org/10.1038/s41467-018-08055-3.
[7] Jiang Y, Raney J R. 3D Printing of Amylopectin-Based Natural Fiber Composites. Adv Mater Technol 2019; 1900521:1900521. https://doi.org/10.1002/admt.201900521.
[8] Compton B G, Lewis J A. 3D-printing of lightweight cellular composites. Adv Mater 2014; 26:5930-5. https://doi.org/10.1002/adma.201401804.
[9] Yunus D E, He R, Shi W, Kaya O, Liu Y. Short fiber reinforced 3d printed ceramic composite with shear induced alignment. Ceram Int 2017; 43:11766-72. https://doi.org/10.1016/j.ceramint.2017.06.012.
[10] Truby R L, Lewis J A. Printing soft matter in three dimensions. Nature 2016; 540:371-8. https://doi.org/10.1038/nature21003.
[11] Raney J R, Lewis J A. Printing mesoscale architectures. MRS Bull 2015; 40:943-50. https://doi.org/10.1557/mrs.2015.235.
[12] Mo C, Jiang Y, Raney J R. Microstructural evolution and failure in short fiber soft composites: Experiments and modeling. J Mech Phys Solids 2020; 141. https://doi.org/10.1016/j.jmps.2020.103973.
[13] Mönnich S, Glöckner R, Becker F. Analysis of Fibre Orientation using pCT Data. 8th Eur LS-DYNA Conf 2011:1-15.
[14] Lauke S-Y F & B. Effects of Fiber Length And Fiber Orientation Distribution on the Tensile Strength of Short-fiber-reinforced Polymers. Compos Part B Eng 1996; 3:9-16.
[15] Nielsen L E. Simple Theory of Stress Strain Properties of Filled Polymers. Rubber Chem Technol 1967; 40:801-5. https://doi.org/10.5254/1.3539094.
[16] Affdl J C H, Kardos J L. The Halpin-Tsai equations: A review. Polym Eng Sci 1976; 16:344-52. https://doi.org/10.1002/pen.760160512.
[17] J. C. Halpin Affdl J L K. The Halpin-Tsai Equations: A Review. Polym Eng Sci 1976; 16:344-52.
[18] Raney J R, Compton B G, Mueller J, Ober T J, Shea K, Lewis J A. Rotational 3D printing of damage-tolerant composites with programmable mechanics. Proc Natl Acad Sci USA 2018; 115:1198-203. https://doi.org/10.1073/pnas.1715157115.
[19] Kokkinis D, Schaffner M, Studart A R. Multimaterial magnetically assisted 3D printing of composite materials. Nat Commun 2015; 6. https://doi.org/10.1038/ncomms9643.
[20] Kim T, Trangkanukulkij R, Kim W S. Nozzle Shape Guided Filler Orientation in 3D Printed Photo-curable Nanocomposites. Sci Rep 2018; 8:1-8. https://doi.org/10.1038/s41598-018-22107-0.

[21] Ober T J, Foresti D, Lewis J A. Active mixing of complex fluids at the microscale. Proc Natl Acad Sci USA 2015; 112:12293-8. https://doi.org/10.1073/pnas.1509224112.

[22] Armstrong C D, Todd N, Alsharhan A T, Bigio D I, Sochol R D. A 3D Printed Morphing Nozzle to Control Fiber Orientation during Composite Additive Manufacturing. Adv Mater Technol 2021; 6:1-10. https://doi.org/10.1002/admt.202000829.

[23] Croom B P, Abbott A, Kemp J W, Rueschhoff L, Smieska L, Woll A, et al. Mechanics of nozzle clogging during direct ink writing of fiber-reinforced composites. Addit Manuf 2021; 37:101701. https://doi.org/10.1016/j.addma.2020.101701.

[24] Blok L G, Longana M L, Yu H, Woods B K S. An investigation into 3D printing of fibre reinforced thermoplastic composites. Addit Manuf 2018; 22:176-86. https://doi.org/10.1016/j.addma.2018.04.039.

[25] Shan S, Kang S H, Raney J R, Wang P, Fang L, Candido F, et al. Multistable Architected Materials for Trapping Elastic Strain Energy. Adv Mater 2015; 27:4296-301. https://doi.org/10.1002/adma.201501708.

[26] Fonck E, Feigl G G, Fasel J, Sage D, Unser M, Rüfenacht D A, et al. Effect of aging on elastin functionality in human cerebral arteries. Stroke 2009; 40:2552-6. https://doi.org/10.1161/STROKEAHA.108.528091.

[27] Rezakhaniha R, Agianniotis A, Schrauwen J T C, Griffa A, Sage D, Bouten C V C, et al. Experimental investigation of collagen waviness and orientation in the arterial adventitia using confocal laser scanning microscopy. Biomech Model Mechanobiol 2012; 11:461-73. https://doi.org/10.1007/s10237-011-0325-z.

[28] Püspöki Z, Storath M, Sage D, Unser M. Transforms and Operators for Directional Bioimage Analysis: A Survey Zsuzsanna. Focus Bio-Image Informatics 2016:69-93. https://doi.org/10.1007/978-3-319-28549-8.

[29] Williams M L, Landel R F, Ferry J D. The Temperature Dependence of Relaxation Mechanisms in Amorphous Polymers and Other Glass-forming Liquids. J Am Chem Soc 1955; 77:3701-7. https://doi.org/10.1021/ja01619a008.

[30] Folgar F, Tucker C L. Orientation Behavior of Fibers in Concentrated Suspensions. J Reinf Plast Compos 1984; 3:98-119. https://doi.org/10.1177/073168448400300201.

[31] Advani S G, Tucker C L. The Use of Tensors to Describe and Predict Fiber Orientation in Short Fiber Composites. J Rheol (N Y N Y) 1987; 31:751-84. https://doi.org/10.1122/1.549945.

[32] Weisstein E W. "Helicoid." n.d. https://mathworld.wolfram.com/Helicoid.html.

Example 2

Figure 6C:
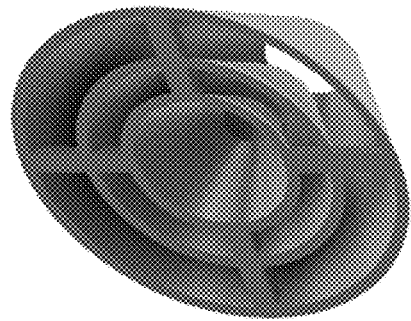
FIGS. 6A-6F show various designs for the insert attachment provided herein. Gradually changing pitch size helicoid (FIG. 6A); fixed pitch helicoid (FIG. 6B); hierarchical cones (FIG. 6C); circular holes (FIG. 6D); circular hole with different size (1.75 mm in the center and 1.5 mm at the outer edge) (FIG. 6E); and circular heads with taper end (FIG. 6F).
Figure 6F:
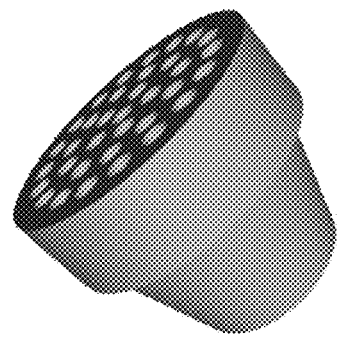
Figure 6B:
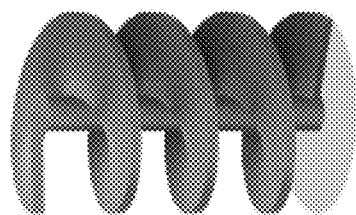
Figure 6E:
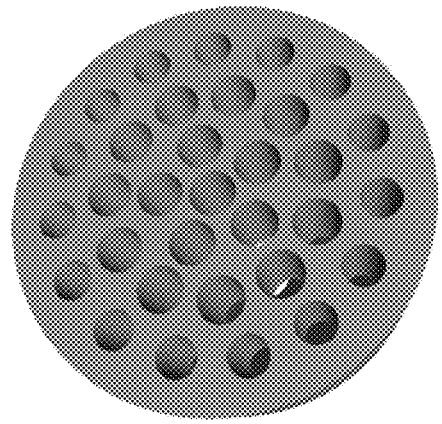
Figure 6A:
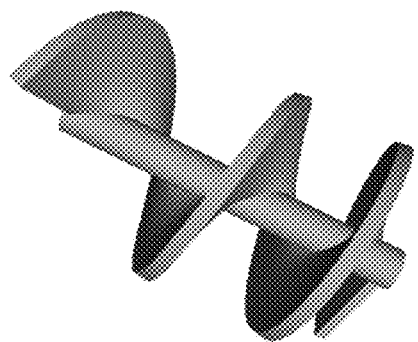
Figure 6D:
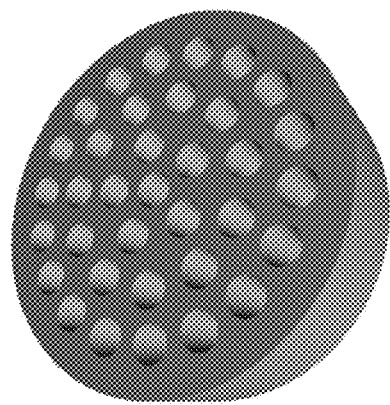

Along with the helicoid insert attachment described above, other designs are also considered as functional designs for the channels. FIGS. 6A-6F provide other non-limiting examples of possible channel geometries. From the top left, FIG. 6A shows a variable pitch helicoid with 15 mm pitch at top and decreasing gradually with 7 mm at the bottom. FIG. 6B is a 7 mm pitch helicoid. FIG. 6C provides a conical hierarchical design, where the insert is a frusto-conical shape with concentric slots. FIG. 6D provides an insert with identically sized holes. The holes in this particular example have 1.5 mm diameter holes. FIG. 6E provides an example with a pattern formed by variably sized holes, having smaller holes in the inner part of the pattern and larger holes in the outer part of the pattern. In this particular example, there are 1.75 mm diameter holes at the inner part and 1.5 mm diameter holes in the outer part. FIG. 6F provides a pattern of holes in an insert with a tapered outlet end. This design fits into the conversing section connecting the vertical syringe to the nozzle (see indicated conversing section in FIG. 3A). This particular example shows 1.5 mm diameter holes. Geometry with hierarchical cones is also a possible option since the fiber alignment is higher in the converging section, the multiple stacking of the converging sections may potentially lead to higher fiber alignment in the flow direction. A version having hierarchical circular-holes is also included. The first design includes the holes of the same size and another design is made with bigger holes in the inner section and smaller holes at the outer section considering the potential of the design to print the filament with varying fiber fraction at the core and the outer surface. The last design is the combination of the circular holes section and the conical section to combine the benefits of both the designs.

Figure 7A:
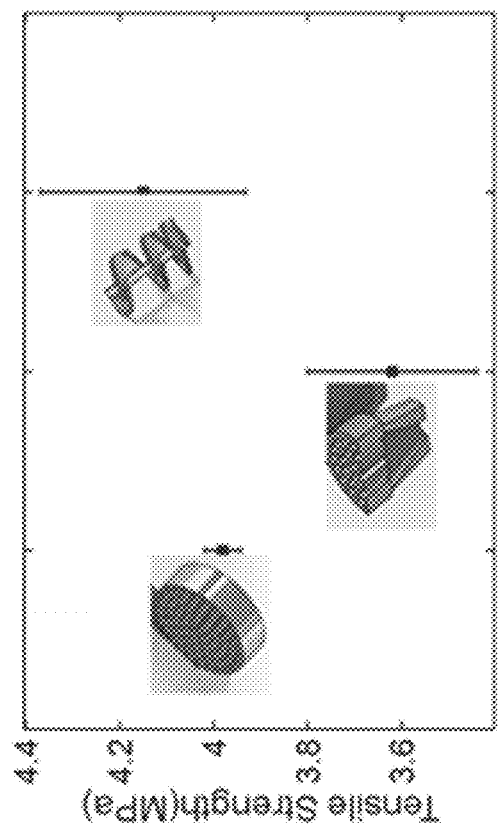
FIGS. 7A-B show results of tensile tests on 3D printed composites in accordance with embodiments of the present disclosure. Tensile strength (FIG. 7A) and stiffness (FIG. 7B) of the samples printed with 6 vol % fiber using circular holes channel, circular head with taper end, and gradually changing (GC) channel, respectively.
Figure 7B:
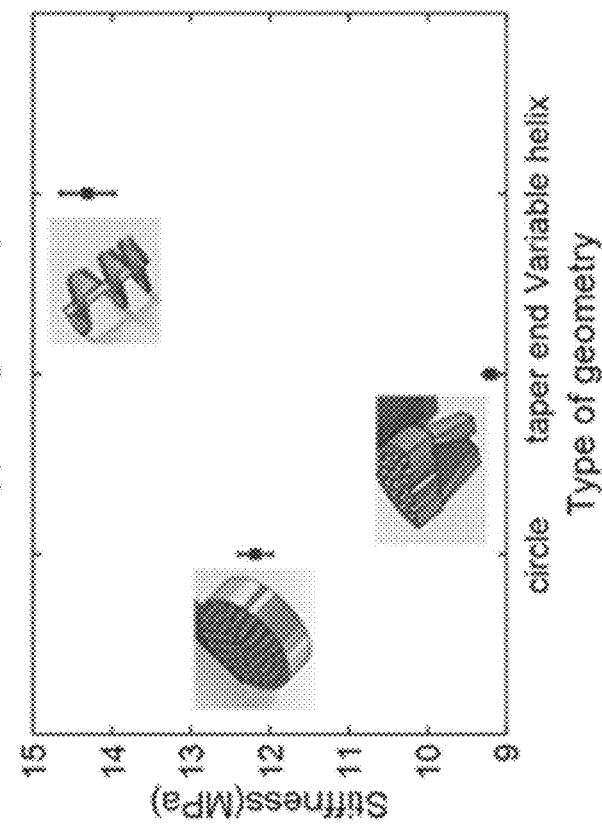

Experimentally, the mechanical properties of 3D printed samples using circular holes channel (FIG. 6D), tapered end channel (FIG. 6F) and gradual pitch helicoid channels (FIG. 6A) are measured. The significant influence by using different channels are observed. The tensile strength and stiffness can be tuned in the range of about 3.4 to 4.4 MPa and about 9 to 14.5 MPa, respectively, as shown in FIGS. 7A and 7B.

A DIW printer can be customized to allow for switching between an FDM and DIW printer (see Appendix). The insert attachment can be sized to accommodate various printer setups, as can be envisioned by one of ordinary skill in the art. In the example provided herein, the insert attachment is sized to fit in Nordson Optimum component system 10 cc syringes with polyethylene micro nozzles (tip diameter 200 to 1600 µm).

CONCLUSIONS

In conclusion, it is seen that by controlling the fiber alignment prior to the nozzle entry a controlled fiber alignment can be achieved during the direct ink writing. The shear induced between the helicoid channel and the ink induce a tendency to the fibers to align along the helicoid flank. It is also seen that the surface area to volume ratio as well as the helix angle of the helicoid plays a determining role for finding the optimum pitch size. The mechanical tests in these particular conditions show that a helicoid with helix angle range of 7.92-10.15° with area to volume ratio of 0.4-0.6 are found to be optimum with an increment of 47.8% and 77.6% for 6 vol %, and 25% and 27.8% for 12 vol % fiber fractions in the tensile strength and stiffness, respectively. The microstructure analysis also showed that the probability of fiber orientation along the printing direction is higher for the modified designs for 400 µm nozzle. As supported by the simulation, it is seen that the higher the variation in distribution of the fiber orientation at the nozzle entry lower the mechanical performance of that sample.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. An insert adapter for a direct ink writing 3D printer, wherein the insert adapter is sized to fit inside a print barrel of the direct ink writing 3D printer, wherein the insert adapter comprises a static helicoid channel forming threads and a center post, wherein the static helicoid channel forming threads and the center post are configured to align a plurality of fibers present in an ink.

2. The insert adapter of claim 1, wherein the static helicoid channel has a constant pitch between threads.

3. The insert adapter of claim 2, wherein the pitch is about 3 mm to 11 mm.

4. The insert adapter of claim 2, wherein the threads have a helix angle of about 3.41° to 12.34°.

5. The insert adapter of claim 1, wherein the static helicoid channel has a gradually decreasing pitch between threads.

6. The insert adapter of claim 5, wherein a starting pitch is about 2.5 times to 1.5 times larger than an ending pitch.

7. The insert adapter of claim 6, wherein the starting pitch is about 15 mm at an inlet end and the ending pitch is about 7 mm at an outlet end.

* * * * *